US012611637B2

(12) United States Patent
Okano

(10) Patent No.: US 12,611,637 B2
(45) Date of Patent: Apr. 28, 2026

(54) FINE BUBBLE GENERATING NOZZLE

(71) Applicant: RINNAI CORPORATION, Nagoya (JP)

(72) Inventor: Yu Okano, Nagoya (JP)

(73) Assignee: RINNAI CORPORATION, Nagoya (JP)

( * ) Notice: Subject to any disclaimer, the term of this patent is extended or adjusted under 35 U.S.C. 154(b) by 285 days.

(21) Appl. No.: 18/322,087

(22) Filed: May 23, 2023

(65) Prior Publication Data

US 2023/0390713 A1 Dec. 7, 2023

(30) Foreign Application Priority Data

Jun. 3, 2022 (JP) ................................ 2022-091030

(51) Int. Cl.

*B01F 23/232* (2022.01)
*B01F 23/2373* (2022.01)
*B01F 25/421* (2022.01)

(52) U.S. Cl.

CPC ........ *B01F 23/232* (2022.01); *B01F 23/2373* (2022.01); *B01F 25/4231* (2022.01)

(58) Field of Classification Search

CPC . B01F 23/2373; B01F 23/232; B01F 25/4231
See application file for complete search history.

(56) References Cited

U.S. PATENT DOCUMENTS 11,826,714 B2 * 11/2023 Shimazu ........... B01F 23/23113
2009/0273103 A1 * 11/2009 Watanabe ............. B01F 23/232 261/28
2023/0390713 A1 * 12/2023 Okano ................ B01F 25/4332
2024/0057303 A1 * 2/2024 Hart ........................ H01L 24/29
(Continued)

FOREIGN PATENT DOCUMENTS

JP 2007-167557 A 7/2007
JP 2008-023502 A 2/2008
(Continued)

OTHER PUBLICATIONS

Japanese Office Action for corresponding Japanese Application No. 2022-091030 mailed on Jan. 20, 2026 with English Translation.

*Primary Examiner* — Joseph A Greenlund
(74) *Attorney, Agent, or Firm* — K&L Gates LLP

(57) ABSTRACT

A fine bubble generating nozzle may include a nozzle unit and a baffle. The nozzle unit may include: an inlet; a pressure decreasing portion configured to decrease a pressure of a gas-dissolved pressurized water introduced from the inlet; a first collision chamber disposed downstream of the pressure decreasing portion and including a first collision wall with which the gas-dissolved pressurized water introduced from the pressure decreasing portion collides so that a flow direction of the gas-dissolved pressurized water changes; a second collision chamber disposed downstream of the first collision chamber and including a second collision wall with which the gas-dissolved pressurized water having flowed through the first collision chamber collides so that the flow direction of the gas-dissolved pressurized water changes; and an outlet. The baffle may be disposed outside of the nozzle unit and is disposed at a position facing the outlet.

6 Claims, 12 Drawing Sheets

(56) References Cited

U.S. PATENT DOCUMENTS

| | | | | |
|---|---|---|---|---|
| 2024/0189783 | A1* | 6/2024 | Hsieh | B01F 23/2373 |
| 2024/0278196 | A1* | 8/2024 | Ohnari | A61H 33/00 |

FOREIGN PATENT DOCUMENTS

| | | | | |
|---|---|---|---|---|
| JP | 2008-161482 | A | | 7/2008 |
| JP | 2008-264282 | A | | 11/2008 |
| JP | 2017176950 | A | * | 10/2017 |
| JP | 2020-054987 | A | | 4/2020 |
| JP | 2020-168219 | A | | 10/2020 |

* cited by examiner (Second Embodiment)

(Second Embodiment)

(Second Embodiment)

FINE BUBBLE GENERATING NOZZLE

CROSS-REFERENCE TO RELATED APPLICATION

This application claims priority from Japanese Patent Application No. 2020-091030 filed on Jun. 3, 2022. The entire content of the priority application is incorporated herein by reference.

BACKGROUND ART

Japanese Patent Application Publication No. 2020-54987 describes a fine bubble generating nozzle which includes a nozzle unit. The nozzle unit includes an inlet into which gas-dissolved pressurized water in which gas is dissolved is introduced; a pressure decreasing portion configured to decrease a pressure of the gas-dissolved pressurized water introduced from the inlet; a first collision chamber disposed downstream of the pressure decreasing portion and including a first collision wall with which the gas-dissolved pressurized water introduced from the pressure decreasing portion collides so that a flow direction of the gas-dissolved pressurized water changes; a second collision chamber disposed downstream of the first collision chamber and including a second collision wall with which the gas-dissolved pressurized water having flowed through the first collision chamber collides so that the flow direction of the gas-dissolved pressurized water changes; and an outlet from which the gas-dissolved pressurized water having flowed through the second collision chamber flows out.

DESCRIPTION

In the fine bubble generating nozzle described in Japanese Patent Application Publication No. 2020-54987, the gas-dissolved pressurized water has its pressure decreased to a pressure lower than an atmospheric pressure, by flowing through the pressure decreasing portion. In the course of the gas-dissolved pressurized water having its pressure decreased, the gas dissolved in the water is separated from the gas-dissolved pressurized water and thereby bubbles are generated in the gas-dissolved pressurized water. The gas-dissolved pressurized water then flows through the first collision chamber and the second collision chamber, by which the pressure of the gas-dissolved pressurized water is gradually increased. When the pressure of the gas-dissolved pressurized water increases, a part of the bubbles in the gas-dissolved pressurized water breaks into fine bubbles. Then, when the gas-dissolved pressurized water flows out of the outlet, the pressure of the gas-dissolved pressurized water is increased to the atmospheric pressure, and a part of the bubbles remaining in the gas-dissolved pressurized water breaks into fine bubbles. In the nozzle unit of the fine bubble generating nozzle as mentioned above, there may be spot(s) where negative pressure is locally large in a flow path downstream of the pressure decreasing portion. When there are such spot(s) where the negative pressure is locally large, the bubbles generated in the course of decreasing the pressure of the gas-dissolved pressurized water may burst. When the bubbles burst, cavitation noise occurs.

The present teachings provide an art configured to reduce cavitation noise.

In a first aspect of the disclosure, a fine bubble generating nozzle may comprise: a nozzle unit; and a baffle. The nozzle unit may comprise: an inlet into which gas-dissolved pressurized water in which gas is dissolved flows; a pressure decreasing portion configured to decrease a pressure of the gas-dissolved pressurized water introduced from the inlet; a first collision chamber disposed downstream of the pressure decreasing portion and including a first collision wall with which the gas-dissolved pressurized water introduced from the pressure decreasing portion collides so that a flow direction of the gas-dissolved pressurized water changes; a second collision chamber disposed downstream of the first collision chamber and including a second collision wall with which the gas-dissolved pressurized water having flowed through the first collision chamber collides so that the flow direction of the gas-dissolved pressurized water changes; and an outlet from which the gas-dissolved pressurized water having flowed through the second collision chamber flows. The baffle may be disposed outside of the nozzle unit and is disposed at a position facing the outlet.

According to the above configuration, the gas-dissolved pressurized water flowing out of the outlet of the nozzle unit collides with the baffle. Because the gas-dissolved pressurized water collides with the baffle, a total pressure loss in the fine bubble generating nozzle becomes large. In this case, the pressure within the nozzle unit can be increased as compared to a configuration where the gas-dissolved pressurized water flowing out of the outlet of the nozzle unit does not collide with the baffle. Due to this, the negative pressure at the spot(s) where the negative pressure is locally large in the nozzle unit can be decreased. Due to this, the bursting of the bubbles within the nozzle unit can be reduced. The cavitation noise can be accordingly reduced. Here, the negative pressure being large means that differential pressure from the atmospheric pressure is large, whereas the negative pressure being small means that the differential pressure from the atmospheric pressure is small.

In a second aspect, according to the first aspect, the baffle may entirely cover the outlet when the fine bubble generating nozzle is seen from the baffle along a first direction extending along a flow path axis, the flow path axis being an axis of a flow path connecting the second collision wall and the outlet.

According to the above configuration, majority of the gas-dissolved pressurized water flowing out of the outlet can be caused to collide with the baffle. In this case, the total pressure loss in the fine bubble generating nozzle is further increased, as a result of which the pressure within the nozzle unit can be further increased. Due to this, the negative pressure at the spot(s) where the negative pressure is locally large in the nozzle unit can be further reduced. Accordingly, the bursting of the bubbles in the nozzle unit can be further suppressed, by which the cavitation noise can be further reduced.

In a third aspect, according to the first or second aspect described above, in a second direction extending along a central axis of the nozzle unit, the first collision wall may be disposed on a first side than the pressure decreasing portion, the second collision wall may be disposed on a second side opposite the first side than the first collision wall, the outlet may be disposed between the first collision wall and the second collision wall, and the baffle may be disposed between the first collision wall and the outlet.

If a distance between the outlet and the baffle is large, the total pressure loss in the fine bubble generating nozzle does not become great even when the gas-dissolved pressurized water flowing out of the outlet in the nozzle unit collides with the baffle. According to the above configuration, the distance between the outlet and the baffle can be made short, and thus the total pressure loss in the fine bubble generating nozzle can be surely increased, by which the pressure within the nozzle unit can be surely increased accordingly. That is, the negative pressure at the spot(s) where the negative pressure is locally large in the nozzle unit can be surely made small. Accordingly, the cavitation noise can be surely reduced.

In a fourth aspect, according to any one of the first to third aspect described above, the baffle may be constituted of an elastic material.

According to the above configuration, even when the bubbles burst inside the nozzle unit, impact caused by the bursting of bubbles is absorbed by the baffle. Thus, the cavitation noise can be further reduced.

In a fifth aspect, according to any one of the first to fourth aspect, the nozzle unit may comprise an attaching portion to which the baffle is attached, and when the baffle is attached to the attaching portion, there may be a space between the attaching portion and the baffle.

According to the above configuration, with the baffle being attached to the attaching portion, the baffle is able to move relative to the attaching portion within the space between the attaching portion and the baffle. When the baffle moves relative to the attaching portion, the impact caused by the bursting of bubbles is absorbed. Due to this, the baffle makes it possible for the impact caused by the bubble bursting to be absorbed at a greater degree as compared to a configuration where there is no space between the attaching portion and the baffle. Thus, the cavitation noise can be further reduced.

In a sixth aspect, according to any one of the first to fifth aspect described above, in a second direction extending along a central axis of the nozzle unit, the first collision wall may be disposed on a first side than the pressure decreasing portion, the outlet may be disposed between the first collision wall and the second collision wall, and the second collision wall may be disposed on a second side opposite the first side than the first collision wall. The nozzle unit may further comprise a peripheral wall extending from an outer end of the first collision wall toward the second side of the second direction and defining a flow path between the first collision chamber and the second collision chamber. The attaching portion may protrude outward from the peripheral wall. When the baffle is attached to the attaching portion, a first side end of the baffle may be disposed on the second side than the first collision wall.

According to the above configuration, a length of the fine bubble generating nozzle in a front-rear direction can be shortened as compared to a configuration where the first-side end of the baffle is located on the first side of the first collision wall.

CONFIGURATION OF FINE BUBBLE GENERATING NOZZLE 10

Figure 1:
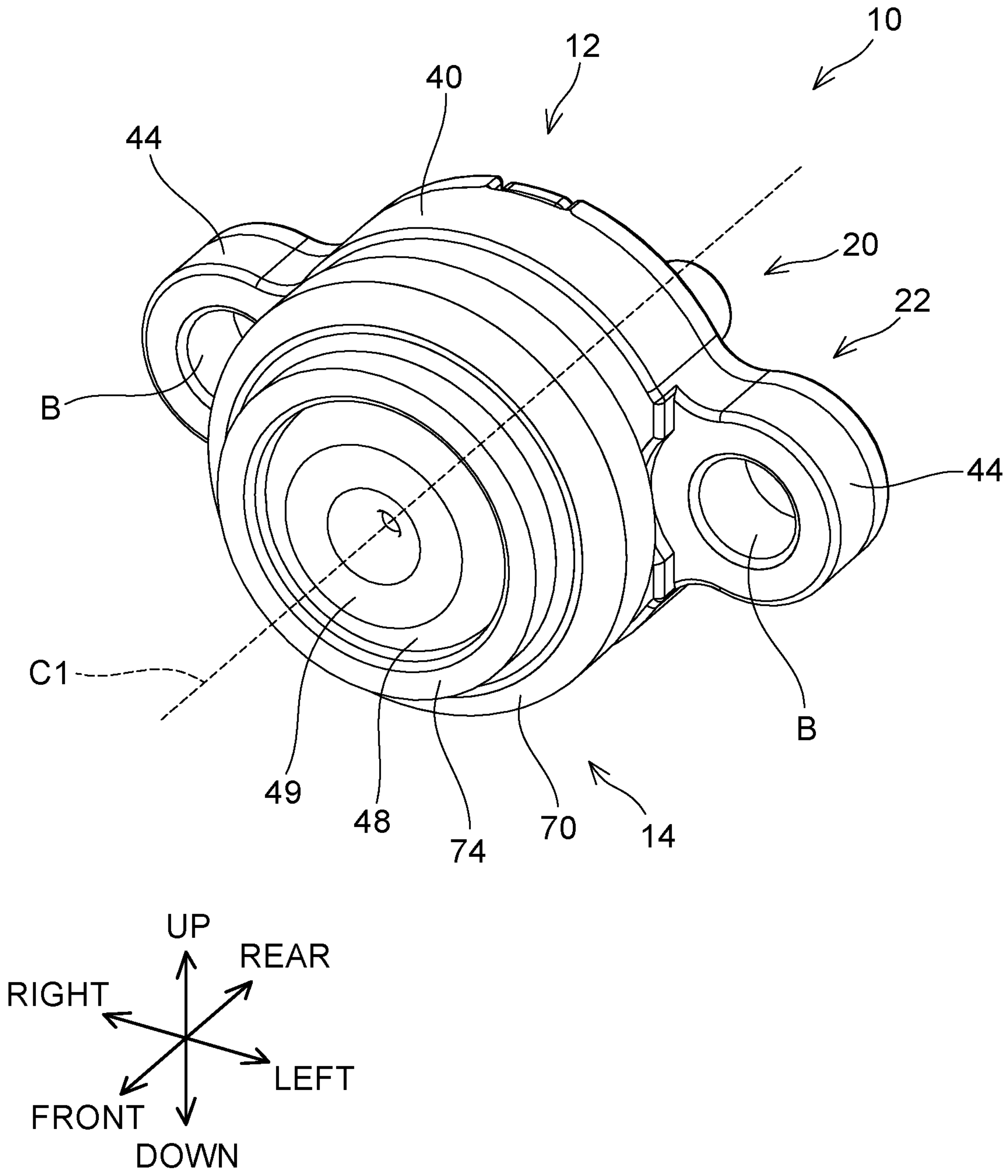
FIG. 1 is a perspective view seeing a fine bubble generating nozzle 10 according to a first embodiment from a front left upper side.

As shown in FIG. 1, the fine bubble generating nozzle 10 comprises a nozzle unit 12 and a baffle 14. The fine bubble generating nozzle 10 is a nozzle configured to generate fine bubbles in a bathtub (not shown), for example. Hereafter, a direction parallel to a central axis C1 of the fine bubble generating nozzle 10 will be termed "a front-rear direction", a direction along which coupler portions 44 to be described later of the nozzle unit 12 are disposed relative to the central axis C1 will be termed "a left-right direction", and a direction vertical to both the front-rear direction and the left-right direction will be termed "an up-down direction".

(Configuration of Nozzle Unit 12)

Figure 2:
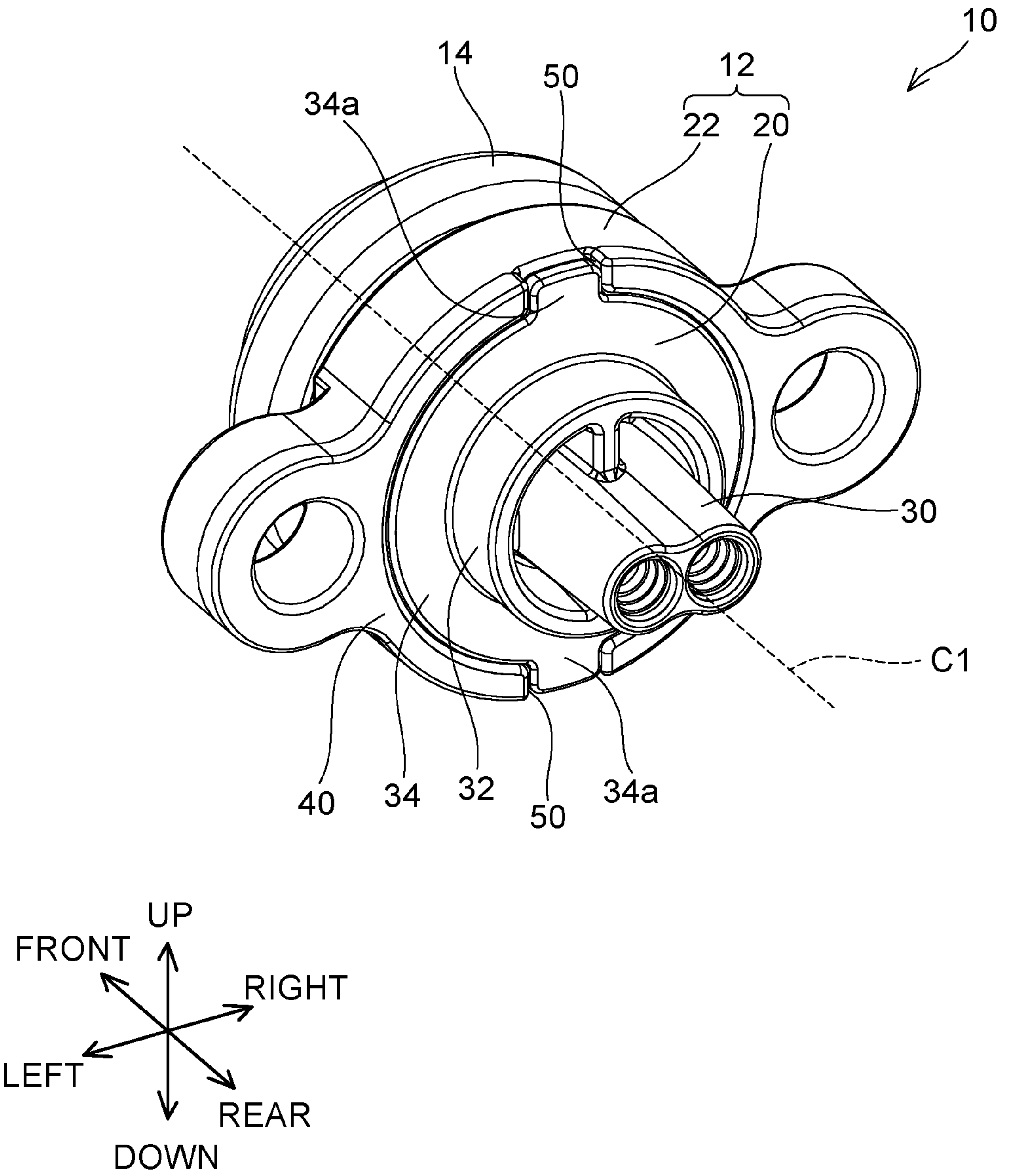
FIG. 2 is a perspective view seeing the fine bubble generating nozzle 10 according to the first embodiment from a rear left upper side.
Figure 3:
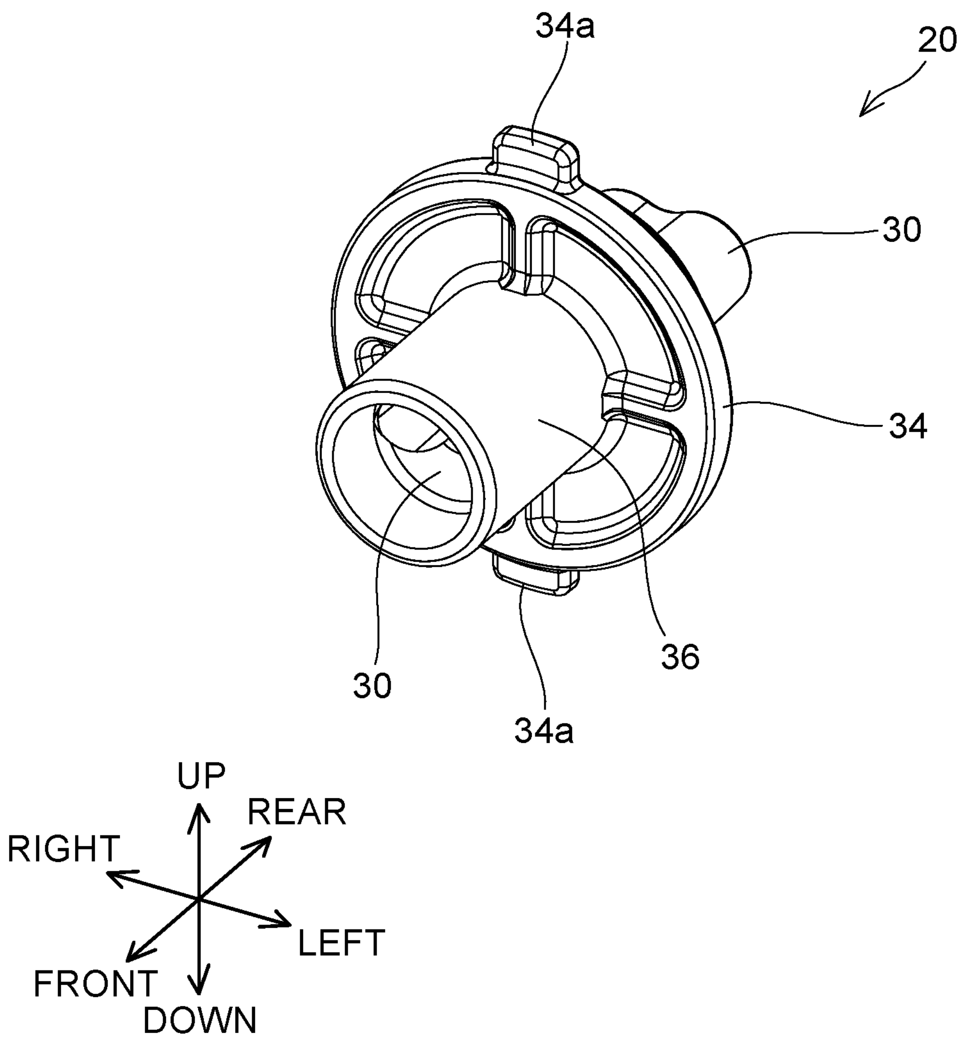
FIG. 3 is a perspective view seeing a nozzle body 20 according to the first embodiment from the front left upper side.
Figure 4:
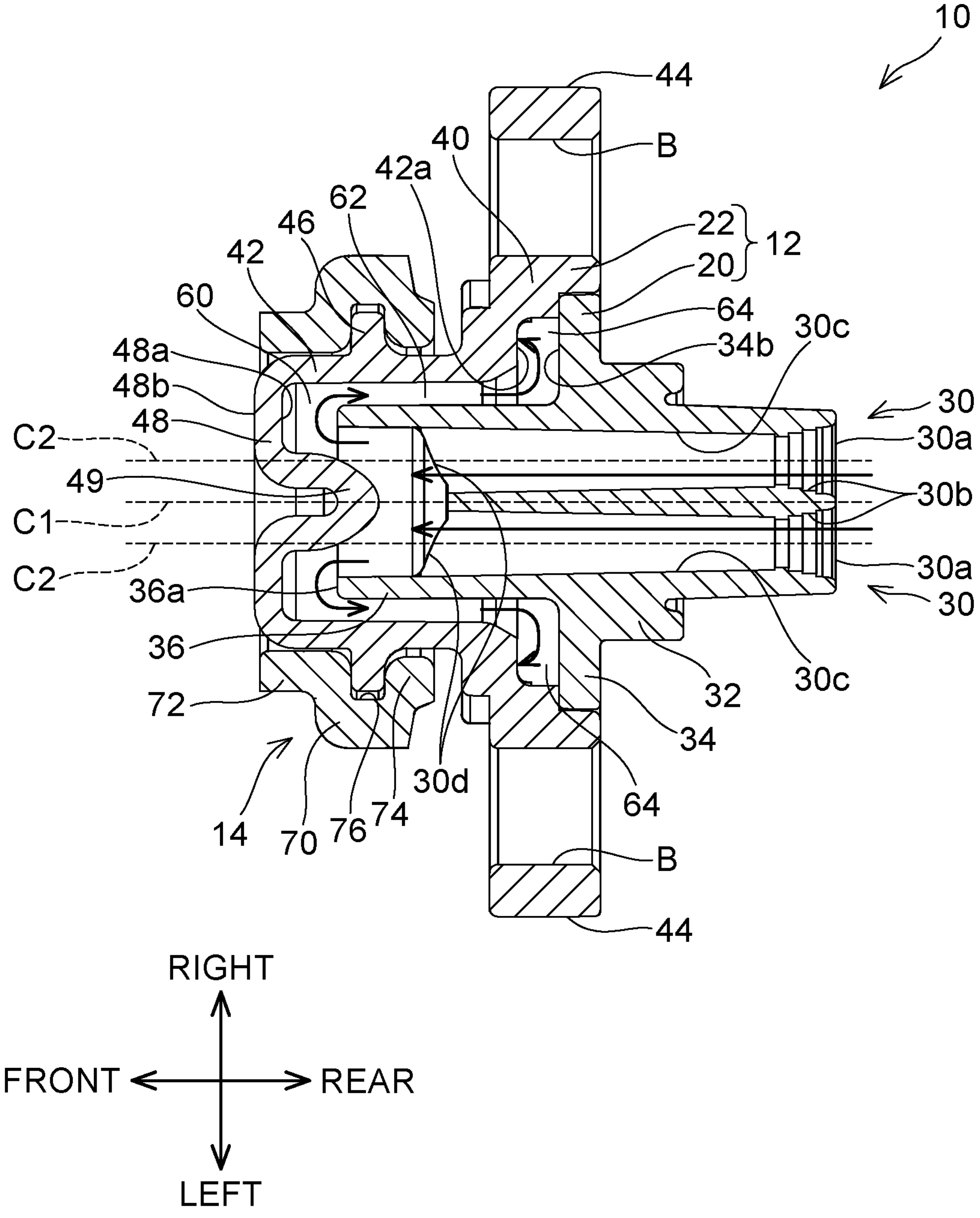
FIG. 4 is a cross-sectional view seeing the fine bubble generating nozzle 10 according to the first embodiment from above.

As shown in FIG. 2, the nozzle unit 12 comprises a nozzle body 20 and the holder 22. The nozzle body 20 and the holder 22 are constituted of resin. The nozzle body 20 is attached to the holder 22. The nozzle body 20 comprises two pressure decreasing portions 30, a first body-side cylinder portion 32, a body-side disk portion 34, and a second body-side cylinder portion 36 (see FIG. 3). The two pressure decreasing portions 30 are aligned in the left-right direction. As shown in FIG. 4, each pressure decreasing portion 30 comprises an inlet 30*a*, a reduced diameter flow path 30*b*, an increased diameter flow path 30*c* connected to a rear end of the reduced diameter flow path 30*b*, and an ejection port 30*d*. A water supply pipe (not shown) for supplying air-dissolved pressurized water in which air is dissolved in water to the fine bubble generating nozzle 10 is connected to the inlets 30*a*. Each reduced-diameter flow path has its flow path diameter reduced in a stepwise manner from rear to front. Each increased diameter flow path 30*c* has it flow path diameter increased gradually from rear to front. In the present embodiment, the flow path diameter of each increased diameter flow path 30*c* is set so that pressure of the air-dissolved pressurized water having flowed through the increased diameter flow path 30*c* becomes lower than the atmospheric pressure. A central axis C2 of each pressure decreasing portion 30 is parallel to the central axis C1. The body-side disk portion 34 is disposed between the first body-side cylinder portion 32 and the second body-side cylinder portion 36. An outer diameter of the body-side disk portion 34 is greater than an outer diameter of the first body-side cylinder portion 32 and an outer diameter of the second body-side cylinder portion 36. As shown in FIG. 2, two projections 34*a* projecting outward from an outer peripheral surface of the body-side disk portion 34 are connected to the body-side disk portion 34. The two projections 34*a* are connected to an upper part of and a lower part of the body-side disk portion 34, respectively. As shown in FIG. 4, the outer diameter of the second body-side cylinder portion 36 is smaller than that of the first body-side cylinder portion 32.

As shown in FIG. 1, the holder 22 comprises a first holder-side cylinder portion a second holder-side cylinder portion 42 (see FIG. 4), the two coupler portions 44, an attaching portion 46 (see FIG. 4), and a holder-side disk portion 48.

The two coupler portions 44 project outward from opposing ends in the left-right direction of the first holder-side cylinder portion 40. Each coupler portion 44 has a screw hole B formed therein. The screw holes B of the coupler portions 44 are for attaching the holder 22 to connector(s) of the bathtub (not shown). The connector(s) of the bathtub are instrument for attaching the fine bubble generating nozzle 10 to the bathtub.

As shown in FIG. 2, two notches 50 are defined at a rear part of the first holder-side cylinder portion 40. The two notches 50 are disposed at an upper part of and a lower part of the first holder-side cylinder portion 40. The notches 50 have shapes corresponding to the projections 34*a* of the nozzle body 20.

Figure 5:
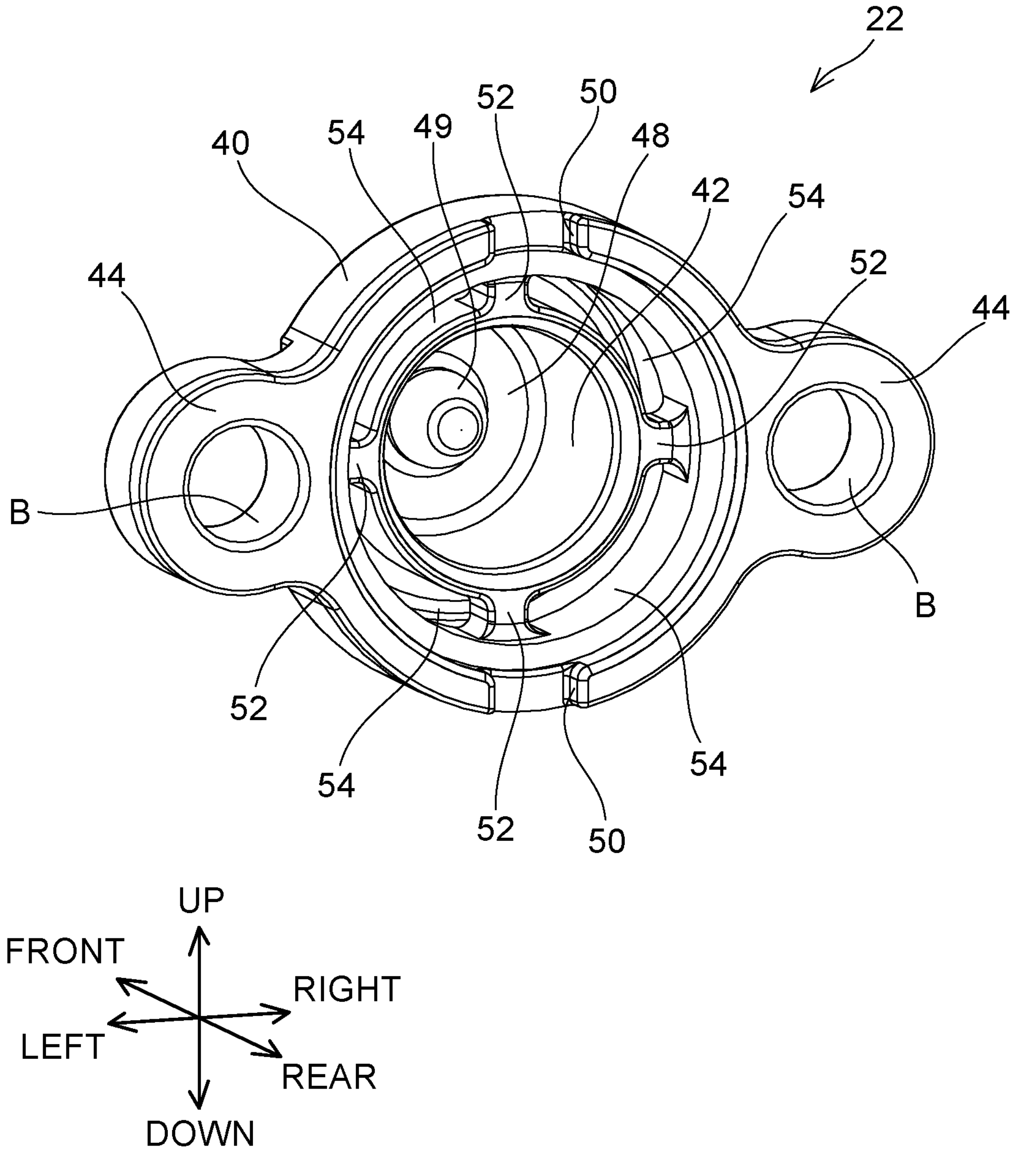
FIG. 5 is a perspective view seeing a holder 22 according to the first embodiment from the rear left upper side.

As shown in FIG. 5, a rear end of the second holder-side cylinder portion 42 is connected to the first holder-side cylinder portion 40 via four connecting portions 52. An outer diameter of the second holder-side cylinder portion 42 is smaller than an inner diameter of the first holder-side cylinder portion 40. Four outlets 54 are formed by the first holder-side cylinder portion 40, the second holder-side cylinder portion 42, and the four coupling portions 52. As shown in FIG. 4, an inner diameter of the second holder-side cylinder portion 42 is larger than an outer diameter of the second body-side cylinder portion 36 of the nozzle body 20. That is, a space is present between the second holder-side cylinder portion 42 and the second body-side cylinder portion 36. The holder-side disk portion 48 is connected to a front end of the second holder-side cylinder portion 42. An outer diameter of the holder-side disk portion 48 is the same as the outer diameter of the second holder-side cylinder portion 42. That is, the second holder-side cylinder portion 42 extends rearward from an outer peripheral end of the holder-side disk portion 48. A projection 49 projecting rearward is disposed at a center of the holder-side disk portion 48. A projecting end of the projection 49 (end on the rear side) is positioned between the ejection ports 30*d* of the pressure decreasing portions 30 and a front end 36*a* of the second body-side cylinder portion 36.

With the nozzle body 20 being attached to the holder 22, within the holder 22, the first collision chamber 60, a first water path 62, the second collision chamber 64, and a second water path 66 (see FIG. 6) are formed. The first collision chamber 60 is a region between a rear surface 48*a* of the holder-side disk portion 48 and the front end 36*a* of the second body-side cylinder portion 36. The first collision chamber 60 is defined by the second holder-side cylinder portion 42, the holder-side disk portion 48, and the projection 49.

The first water path 62 is a water path connecting the first collision chamber 60 and the second collision chamber 64. The first water path 62 is defined by the second body-side cylinder portion 36 and the second holder-side cylinder portion 42.

The second collision chamber 64 is a region between the rear end 42*a* of the second holder-side cylinder portion 42 and a front surface 34*b* of the body-side disk portion 34. The second collision chamber 64 is defined by the first holder-side cylinder portion 40, the body-side disk portion 34, and the second body-side cylinder portion 36. In the present embodiment, a volume of the second collision chamber 64 is greater than a volume of the first collision chamber 60.

Figure 6:
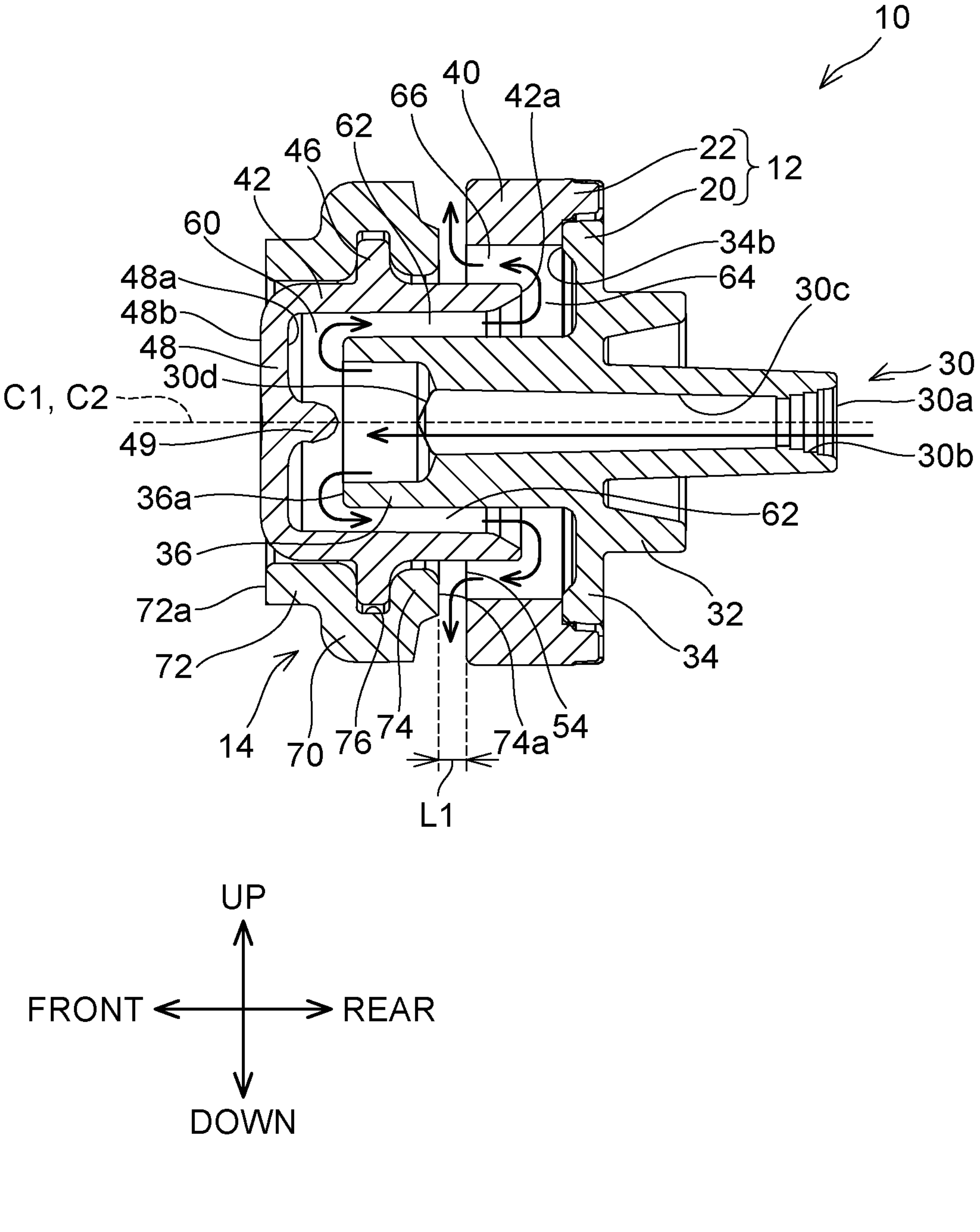
FIG. 6 is a cross-sectional view seeing the fine bubble generating nozzle 10 according to the first embodiment from a left side.

As shown in FIG. 6, the second water path 66 is a water path connecting the second collision chamber 64 and the outlets 54. The second water path 66 is defined by the space between the first holder-side cylinder portion 40 and the second holder-side cylinder portion 42.

The attaching portion 46 projects outward from an outer surface of the second holder-side cylinder portion 42. The attaching portion 46 is disposed between the first collision chamber 60 and the second collision chamber 64 in the front-rear direction.

(Configuration of Baffle 14)

Figure 7:
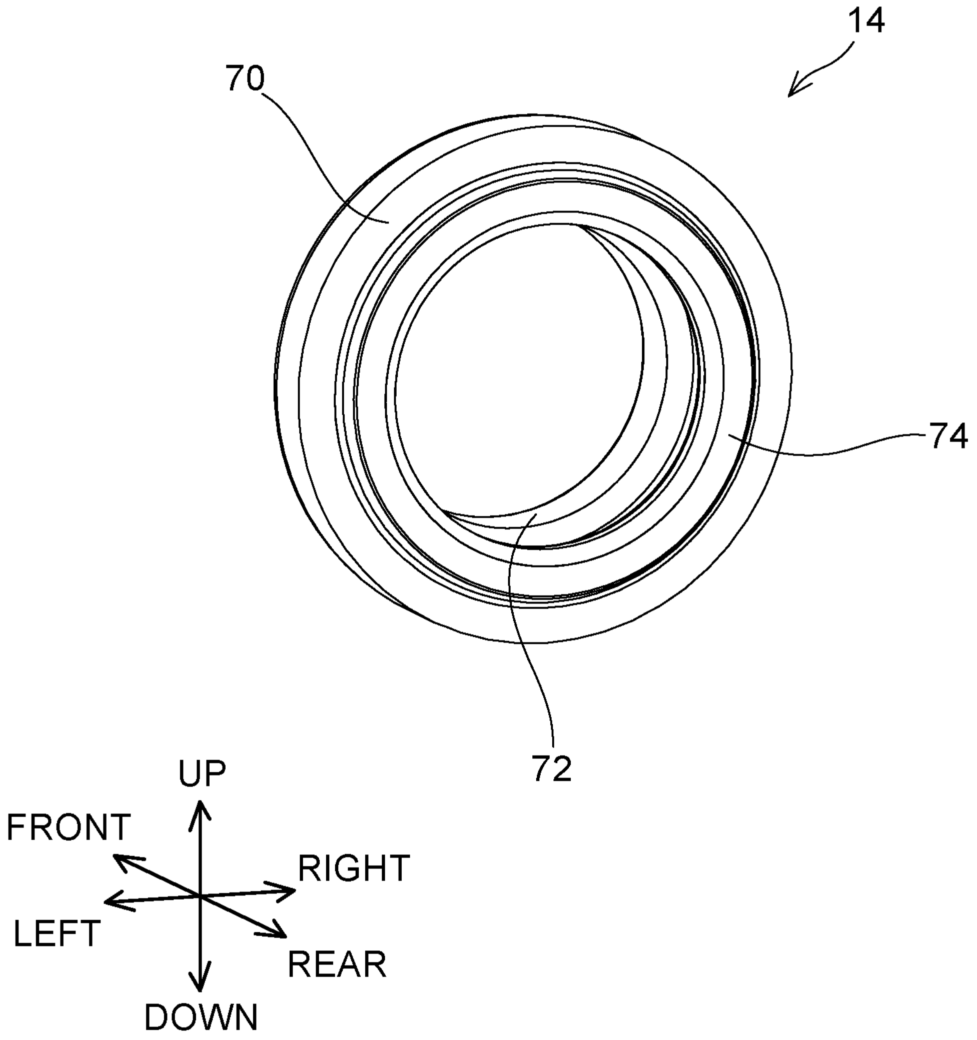
FIG. 7 is a perspective view seeing a baffle 14 according to the first embodiment from the rear left upper side.
Figure 8:
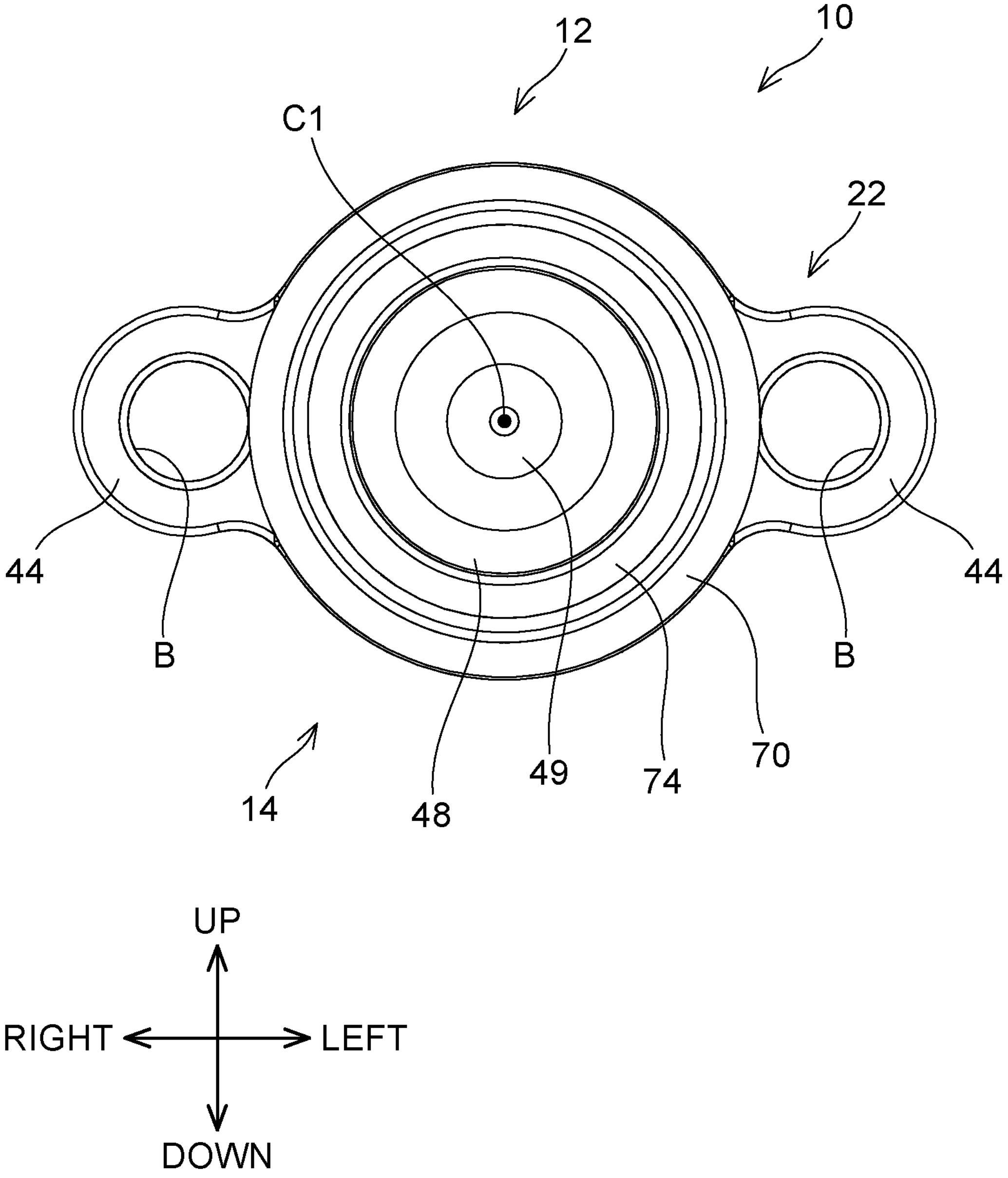
FIG. 8 is a front view of the fine bubble generating nozzle 10 according to the first embodiment.

The baffle 14 in FIG. 7 is constituted of elastic material such as rubber. The baffle 14 comprises a first baffle-side cylinder portion 70, a second baffle-side cylinder portion 72, and a third baffle-side cylinder portion 74. As shown in FIG. 6, an inner diameter of the first baffle-side cylinder portion 70 is slightly larger than an outer diameter of the attaching portion 46. The second baffle-side cylinder portion 72 extends frontward from a front end of the first baffle-side cylinder portion 70. With the baffle 14 attached to the attaching portion 46, a front end 72*a* of the second baffle-side cylinder portion 72 is slightly positioned more on the rear side than a front surface 48*b* of the holder-side disk portion 48 is. An inner diameter of the second baffle-side cylinder portion 72 is smaller than the inner diameter of the first baffle-side cylinder portion 70, and is slightly larger than the outer diameter of the second holder-side cylinder portion 42. The third baffle-side cylinder portion 74 extends rearward from a rear end of the first baffle-side cylinder portion 70. A rear end 74*a* of the third baffle-side cylinder portion 74 is disposed between the first collision chamber 60 and the outlets 54. A distance L1 between the rear end 74*a* of the third baffle-side cylinder portion 74 and the outlets 54 is 1 mm. The distance L1 preferably is within a range of 0.5 mm to 2 mm. An inner diameter of the third baffle-side cylinder portion 74 is smaller than the inner diameter of the first baffle-side cylinder portion 70, is slightly larger than the outer diameter of the second holder-side cylinder portion 42, and is slightly larger than the inner diameter of the second baffle-side cylinder portion 72. A recess 76 recessed outward in a radial direction is defined by an inner peripheral surface of the first baffle-side cylinder portion 70, a rear surface of the second baffle-side cylinder portion 72, and a front surface of the third baffle-side cylinder portion 74. A width of the recess 76 in the front-rear direction is the same as a width of the attaching portion 46 in the front-rear direction. With the baffle 14 attached to the attaching portion 46 of the nozzle unit 12, the baffle 14 is in contact with the attaching portion 46 of the nozzle unit 12 in the front-rear direction, and a space is present between the baffle 14 and the attaching portion 46, and between the baffle 14 and the second holder-side cylinder portion 42 in the radial direction. Also, as shown in FIG. 8, as the fine bubble generating nozzle 10 is seen from front, the four outlets 54 (see FIG. 5) are entirely covered by the baffle 14.

Subsequently, fine bubbles generated by the fine bubble generating nozzle 10 will be described with reference to FIG. 6. Arrows in solid lines indicate water paths in FIG. 6.

The air-dissolved pressurized water flows into the fine bubble generating nozzle 10 through the inlets 30*a* of the pressure decreasing portions 30. The pressure of the air-dissolved pressurized water at this timing is greater than the atmospheric pressure. The air-dissolved pressurized water flows through the reduced diameter flow paths 30*b* of the pressure decreasing portions 30, by which the flow speed of the air-dissolved pressurized water is accelerated, resulting in the pressure of the air-dissolved pressurized water being decreased to a pressure lower than the atmospheric pressure. At this timing, bubbles are generated in the air-dissolved pressurized water. The air-dissolved pressurized water having flowed through the reduced diameter flow paths 30*b* of the pressure decreasing portions 30 flows through the increased diameter flow paths 30*c*, during which the flow speed of the air-dissolved pressurized water slows down. The flow speed lowers, as a result of which the pressure of the air-dissolved pressurized water is increased. The increased pressure of the air-dissolved pressurized water causes the bubbles in the air-dissolved pressurized water to shrink. As a result of this, a part of the bubbles contained in the air-dissolved pressurized water breaks into fine bubbles.

Next, the air-dissolved pressurized water is ejected into the first collision chamber 60 of the holder 22 through the ejection ports 30*d* of the pressure decreasing portions 30. The air-dissolved pressurized water is ejected into the first collision chamber 60, by which the flow speed of the air-dissolved pressurized water slows down. Due to this, the pressure of the air-dissolved pressurized water is further increased, and a part of the air-dissolved pressurized water further breaks into fine bubbles. Next, the air-dissolved pressurized water having collided with the holder-side disk portion 48 flows through the first water path 62, and flows into the second collision chamber 64. As mentioned above, the volume of the second collision chamber 64 is greater than the volume of the first collision chamber 60. Due to this, the flow speed of the air-dissolved pressurized water having flowed into the second collision chamber 64 further slows down. Due to this, the pressure of the air-dissolved pressurized water is further increased, by which a part of the bubbles in the air-dissolved pressurized water breaks into fine bubbles.

Subsequently, the air-dissolved pressurized water having collided with the body-side disk portion 34 flows through the second water path 66 and the outlets 54 of the holder 22 and exit out of the outlets 54 of the nozzle unit 12. The air-dissolved pressurized water having flowed out of the outlets 54 collides with the third baffle-side cylinder portion 74 of the baffle 14. Also, a part of the air-dissolved pressurized water collides with the first baffle-side cylinder portion 70 of the baffle 14. Thereafter, the air-dissolved pressurized water exits into a certain site such as a bathtub. The pressure of the air-dissolved pressurized water is increased to the atmospheric pressure at the site. Due to this, the bubbles remaining in the air-dissolved pressurized water having flowed through the second collision chamber 64 shrink, and thus a part of those bubbles further breaks into fine bubbles. Here, the air-dissolved pressurized water flowing into the site contains the fine bubbles that were generated at the first collision chamber 60 and the second collision chamber 64 also. Due to this, a great amount of the fine bubbles emerges at the site.

As mentioned above, as shown in FIG. 1, the fine bubble generating nozzle 10 comprises the nozzle unit 12 and the baffle 14. The nozzle unit 12 comprises: the inlets into which air-dissolved pressurized water in which air (example of "gas") is dissolved flows; the pressure decreasing portions 30 configured to decrease a pressure of the air-dissolved pressurized water introduced from the inlets 30*a*; the first collision chamber 60 disposed downstream of the pressure decreasing portions 30 and including the holder-side disk portion 48 (example of "first collision wall") with which the air-dissolved pressurized water introduced from the pressure decreasing portions 30 collides so that a flow direction of the air-dissolved pressurized water changes; the second collision chamber 64 disposed downstream of the first collision chamber 60 and including the body-side disk portion 34 (example of "second collision wall") with which the air-dissolved pressurized water having flowed through the first collision chamber 60 collides so that the flow direction of the air-dissolved pressurized water changes; and the outlets 54 from which the air-dissolved pressurized water having flowed through the second collision chamber 64 flows out. As shown in FIG. 6, the baffle 14 is disposed outside of the nozzle unit 12 and is disposed at a position facing the outlets 54. Because the air-dissolved pressurized water collides with the baffle 14, a total pressure loss in the fine bubble generating nozzle 10 becomes large. In this case, the pressure within the nozzle unit 12 can be increased as compared to a configuration where the air-dissolved pressurized water flowing out of the outlets 54 of the nozzle unit 12 does not collide with the baffle 14. Due to this, the negative pressure at the spot(s) where the negative pressure is locally large in the nozzle unit 12 can be decreased. Due to this, the bursting of the bubbles within the nozzle unit can be reduced. The cavitation noise can be accordingly reduced.

As shown in FIG. 8, the baffle 14 entirely covers the outlets 54 when the fine bubble generating nozzle 10 is seen from the baffle 14 along the front-rear direction (example of "a first direction") extending along the flow path axis, the flow path axis being an axis of a flow path connecting the body-side disk portion 34 and the outlets 54. According to the above configuration, majority of the air-dissolved pressurized water flowing out of the outlets 54 can be caused to collide with the baffle 14. In this case, the total pressure loss in the fine bubble generating nozzle 10 is further increased, as a result of which the pressure within the nozzle unit 12 can be further increased. Due to this, the negative pressure at the spot(s) where the negative pressure is locally large in the nozzle unit 12 can be further reduced. Accordingly, the bursting of the bubbles in the nozzle unit 12 can be further suppressed, by which the cavitation noise can be further reduced.

As shown in FIG. 6, in the front-rear direction (example of "second direction") extending along the central axis C1 of the nozzle unit 12, the holder-side disk portion 48 is disposed on the front side (example of "first side") than the pressure decreasing portions 30 are, the body-side disk portion 34 is disposed on the rear side (example of "second side") than the holder-side disk portion 48, the outlets 54 are disposed between the first collision chamber 60 and the second collision chamber 64, and the baffle 14 is disposed between the first collision chamber 60 and the outlets 54. If a distance between the outlets 54 and the baffle 14 is large, the total pressure loss in the fine bubble generating nozzle 10 does not become great even when the air-dissolved pressurized water flowing out of the outlets 54 in the nozzle unit 12 collides with the baffle 14. According to the above configuration, the distance between the outlets 54 and the baffle 14 can be made short, and thus the total pressure loss in the fine bubble generating nozzle 10 can be surely increased, by which the pressure within the nozzle unit 12 can be surely increased accordingly. That is, the negative pressure at the spot(s) where the negative pressure is locally large in the nozzle unit 12 can be surely made small. Accordingly, the cavitation noise can be surely reduced.

The baffle 14 is constituted of the elastic material. According to the above configuration, even when the bubbles burst inside the nozzle unit 12, impact caused by the bursting of bubbles is absorbed by the baffle 14. Thus, the cavitation noise can be further reduced.

As shown in FIG. 4, the nozzle unit 12 comprises the attaching portion 46 to which the baffle 14 is attached. When the baffle 14 is attached to the attaching portion 46, there is a space between the attaching portion 46 and the baffle 14. According to the above configuration, with the baffle 14 being attached to the attaching portion 46, the baffle 14 is able to move relative to the attaching portion 46 within the space between the attaching portion 46 and the baffle 14. In other words, the baffle 14 can vibrate. By the baffle 14 vibrating, the impact caused by the burst of the bubbles can be absorbed. Due to this, the baffle 14 makes it possible for the impact caused by the bubble bursting to be absorbed at a greater degree as compared to a configuration where there is no space between the attaching portion 46 and the baffle 14. Thus, the cavitation noise can be further reduced. In the present embodiment in particular, the space is present between the nozzle unit 12 (specifically, the attaching portion 46 and the second holder-side cylinder portion 42) and the baffle 14 in the radial direction, but no space is present between the nozzle unit 12 (specifically, the attaching portion 46) and the baffle 14 in the central axis C1 direction (i.e., front-rear direction). Due to this, the baffle 14 is able to vibrate in the radial direction, but is unable to do so in the central axis C1 direction. Since the baffle 14 is incapable of vibrating in the central axis C1 direction, a distance between the outlets 54 and the baffle 14 remains constant, which allows to stabilize the pressure inside the nozzle unit 12.

As shown in FIG. 4, in the front-rear direction parallel to the central axis C1 direction of the nozzle unit 12, the holder-side disk portion 48 is disposed on the front side than the pressure decreasing portions 30 are, the outlets 54 are disposed between the holder-side disk portion 48 and the body-side disk portion 34, and the body-side disk portion 34 is disposed on the rear side than the holder-side disk portion 48. The nozzle unit 12 further comprises the second holder-side cylinder portion 42 (example of "peripheral wall") extending rearward (example of "toward a second side") from the outer peripheral end of the holder-side disk portion 48 in the front-rear direction and defining the first flow path (example of "flow path") between the first collision chamber 60 and the second collision chamber 64. The attaching portion 46 protrudes outward from the second holder-side cylinder portion 42. When the baffle 14 is attached to the attaching portion 46, a front-side end of the baffle 14 is disposed on the rear side than the holder-side disk portion 48. According to the above configuration, a length of the fine bubble generating nozzle 10 in the front-rear direction can be shortened as compared to a configuration where the first-side end of the baffle 14 is located on the first side of the holder-side disk portion 48.

(Second Embodiment)

A fine bubble generating nozzle 210 according to a second embodiment will be described with reference to FIGS. 9 to 12. In the present embodiment, a configuration of a holder 222 is different from that of the holder 22 in the first embodiment. Hereafter, like configurations between the embodiments are given the same reference numerals, and descriptions thereof may be omitted.

Figure 9:
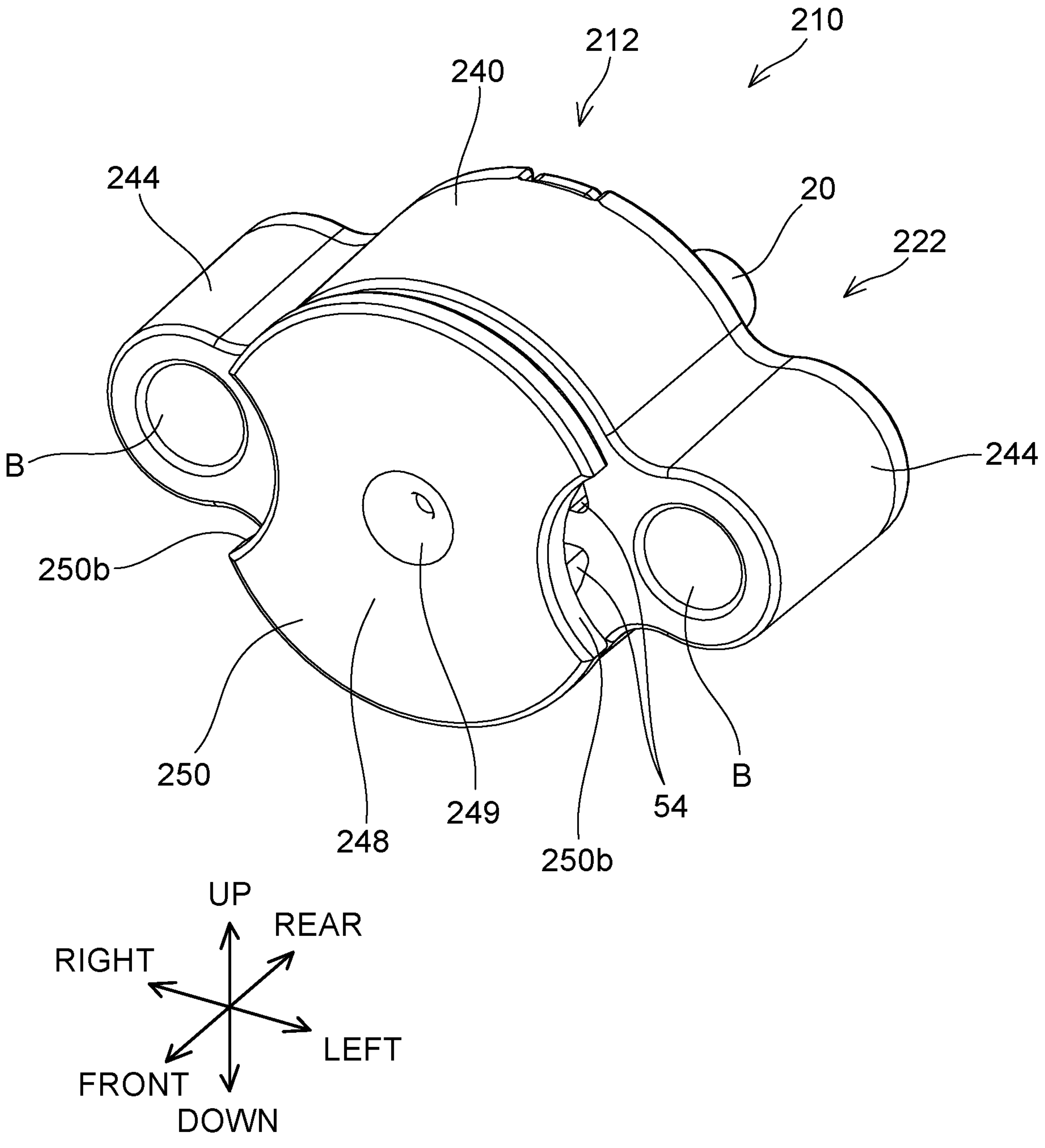
FIG. 9 is a perspective view seeing a fine bubble generating nozzle 210 according to a second embodiment from the front left upper side.
Figure 10:
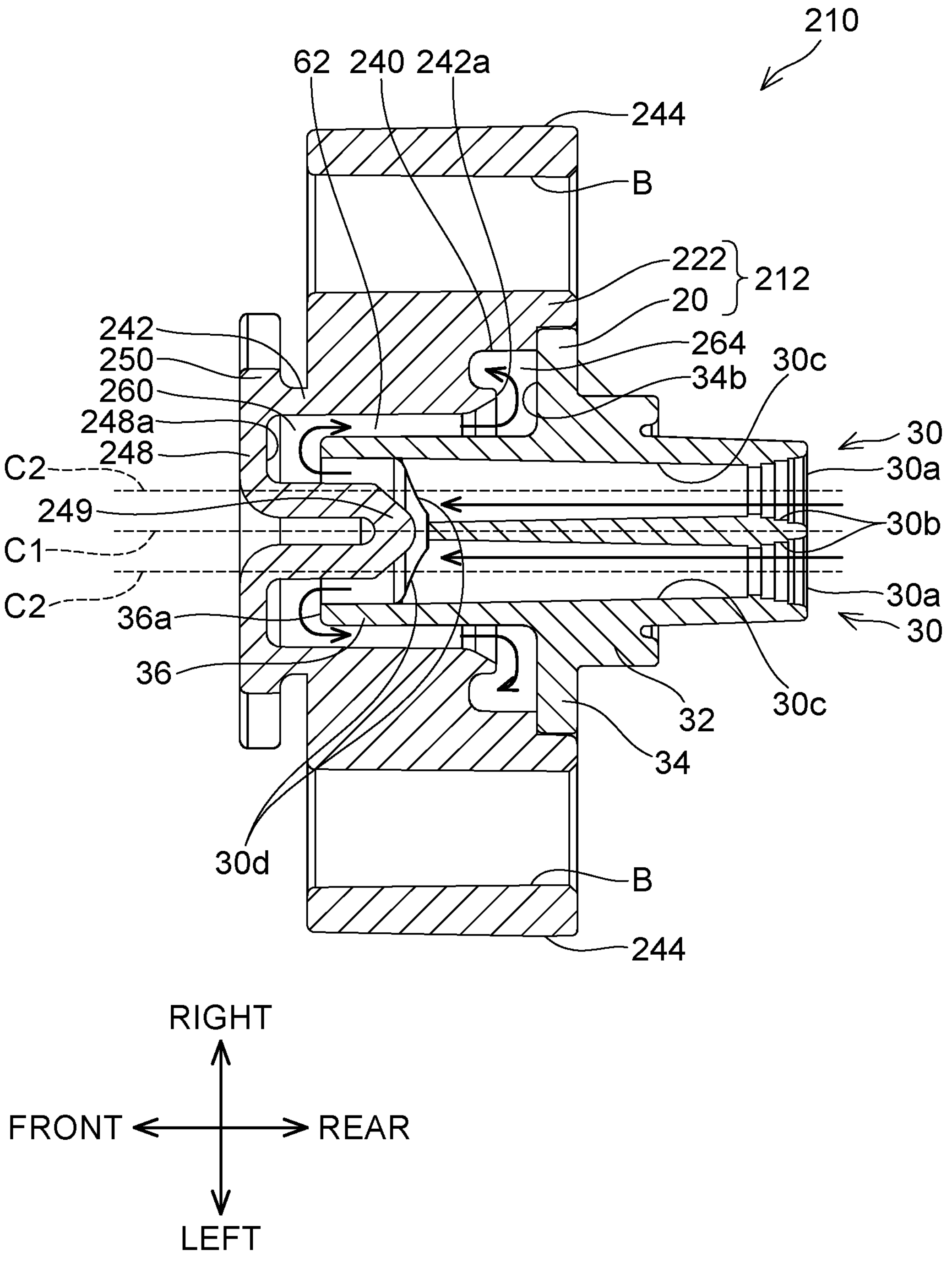
FIG. 10 is a cross-sectional view seeing the fine bubble generating nozzle 210 according to the second embodiment from above.

As shown in FIG. 9, the fine bubble generating nozzle 210 comprises a nozzle unit 212. The nozzle unit 212 comprises the nozzle body 20 and the holder 222. The holder 222 is constituted of resin. The holder 222 comprises a first holder-side cylinder portion 240, a second holder-side cylinder portion 242 (see FIG. 10), two coupler portions 244, and a holder-side disk portion 248. The first holder-side cylinder portion 240, the second holder-side cylinder portion 242 (see FIG. 10), and the coupler portions 244 respectively have configurations substantially the same as those of the first holder-side cylinder portion 40 (see FIG. 4), the second holder-side cylinder portion 42 (see FIG. 4), and the coupler portions 44 (see FIG. 4) in the first embodiment except that lengths in the front-rear direction of the respective ones are different.

Figure 11:
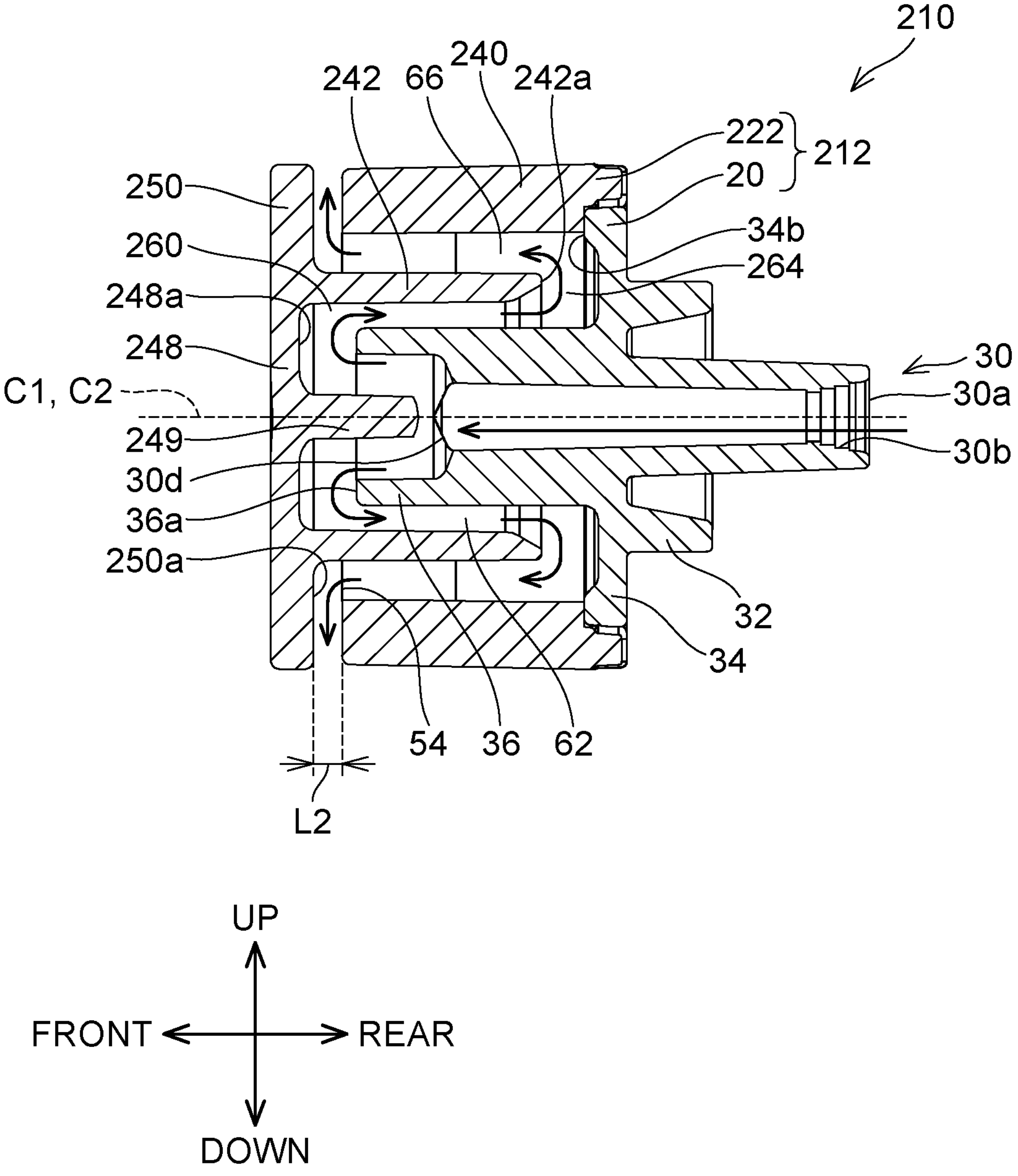
FIG. 11 is a cross-sectional view seeing the fine bubble generating nozzle 210 according to the second embodiment from the left side.
Figure 12:
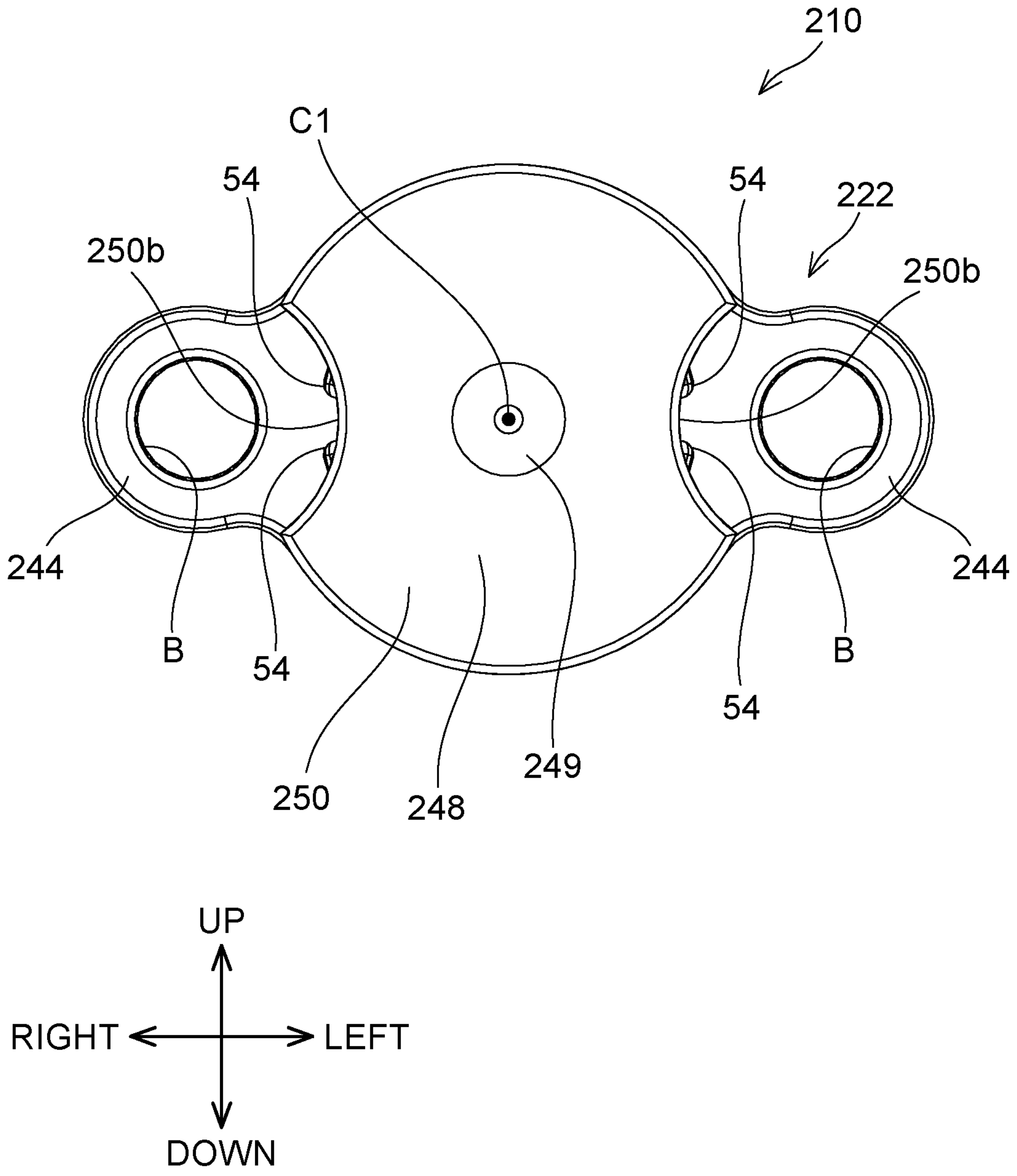
FIG. 12 is a front view of the fine bubble generating nozzle 210 according to the second embodiment.

As shown in FIG. 11, a projection 249 projecting rearward is disposed at a center of the holder-side disk portion 248. A projecting end of the projection 249 (end on the rear side) is positioned between the ejection ports **30*d* of the pressure decreasing portions 30 and the front end 36*a* of the second body-side cylinder portion 36. A first collision chamber 260 according to the present embodiment is a region between a rear surface 248*a* of the holder-side disk portion 248 and the front end 36*a* of the second body-side cylinder portion 36. The first collision chamber 260 is defined by the second holder-side cylinder portion 242, the holder-side disk portion 248, and the projection 249. A second collision chamber 264 is a region between a rear end 242*a* of the second holder-side cylinder portion 242 and the front surface 34*b* of the body-side disk portion 34. The second collision chamber 264 is defined by the first holder-side cylinder portion 240, the body-side disk portion 34, and the second body-side cylinder portion 36. The fine bubble generating nozzle 210 further comprises a baffle 250. The baffle 250 extends rearward in the radial direction from an outer peripheral surface of the holder-side disk portion 248. The baffle 250 is integrated with the holder-side disk portion 248, and is constituted of resin. The baffle 250 is disposed at a position facing the outlets 54 in the front-rear direction. An outer diameter of the baffle 250 is the same as an outer diameter of the first holder-side cylinder portion 240. A distance L2 between a rear surface 250*a* of the baffle 250 and the outlets 54 is 1 mm. Here, the distance L2 is preferably within a range of 0.5 mm to 2 mm. As shown in FIG. 12, notches 250*b* are defined in the baffle 250 at opposing sides in the left-right direction, respectively. As the fine bubble generating nozzle 210 is seen from front, substantially entireties of the four outlets 54 are covered by the baffle 250. Alternatively, in a variant, as the fine bubble generating nozzle 210 is seen from front, the entireties of the four outlets 54 may be fully covered by the baffle 250**.

As mentioned above, as shown in FIG. 11, the fine bubble generating nozzle 210 comprises the nozzle unit 212 and the baffle 250, and the nozzle unit 212 comprises: the inlets **30*a* into which the air-dissolved pressurized water in which air is dissolved flows; the pressure decreasing portions 30 configured to decrease the pressure of the air-dissolved pressurized water introduced from the inlets 30*a*; the first collision chamber 260 disposed downstream of the pressure decreasing portions 30 and including the holder-side disk portion 248 (example of "first collision wall") with which the air-dissolved pressurized water introduced from the pressure decreasing portions 30 collides so that a flow direction of the air-dissolved pressurized water changes; the second collision chamber 264 disposed downstream of the holder-side disk portion 248 and including the body-side disk portion 34 with which the air-dissolved pressurized water having flowed through the first collision chamber 260 collides so that the flow direction of the air-dissolved pressurized water changes; and the outlets 54 from which the air-dissolved pressurized water having flowed through the second collision chamber 264 flows out. The baffle 250 is disposed outside of the nozzle unit 212 and is disposed at a position facing the outlets 54. According to the above configuration, the air-dissolved pressurized water flowing out of the outlets 54 of the nozzle unit 212 collides with the baffle 250. Because the air-dissolved pressurized water collides with the baffle 250, a total pressure loss in the fine bubble generating nozzle 210 becomes large. In this case, the pressure within the nozzle unit 212 can be increased as compared to a configuration where the air-dissolved pressurized water flowing out of the outlets 54 of the nozzle unit 212 does not collide with the baffle 250. Due to this, the negative pressure at the spot(s) where the negative pressure is locally large in the nozzle unit 212 can be decreased. Due to this, the bursting of the bubbles within the nozzle unit 212** can be reduced. The cavitation noise can be accordingly reduced.

Specific examples of the present disclosure have been described in detail, however, these are mere exemplary indications and thus do not limit the scope of the claims. The art described in the claims includes modifications and variations of the specific examples presented above.

(First Variant) In the above embodiments, the air-dissolved pressurized water flows into the fine bubble generating nozzle 10. In a variant, gas-dissolved pressurized water in which gas is dissolved may flow into the fine bubble generating nozzle 10, instead of the air-dissolved pressurized water. According to such configuration, an amount of the fine bubbles ejected at an ejecting spot can be increased by the gas-dissolved pressurized water flowing through the fine bubble generating nozzle 10. The gas as used may be carbon-rich gas, oxygen, or hydrogen, for example.

(Second Variant) A number of the pressure decreasing portions 30 disposed in the nozzle body 20 may not be limited to two, but may be one, or three or more.

(Third Variant) In the first embodiment, the entireties of the outlet(s) 54 may not be fully covered by the baffle 14 as the fine bubble generating nozzle 10 is seen from front. That is, a part of the outlet(s) 54 may be covered by the baffle 14 as the fine bubble generating nozzle 10 is seen from front.

(Fourth Variant) In the first embodiment, the baffle 14 may be on the front side than the first collision chamber 60 is.

(Fifth Variant) In the first embodiment, the baffle 14 may not be constituted of elastic material, but may be constituted of resin.

(Sixth Variant) In the first embodiment, a space may not be present between the baffle 14 and the attaching portion 46 or between the baffle 14 and the second holder-side cylinder portion 42.

(Seventh Variant) In the first embodiment, the baffle 14 may be attached to the outer surface of the second holder-side cylinder portion 42 via adhesive, for example. In the present variant, "attaching portion" may be omitted.

(Eighth Variant) In the first embodiment, the attaching portion 46 may project outward or frontward from the outer surface of the holder-side disk portion 48. In the present variant, a front end of the attaching portion 46 is located on the front side than the holder-side disk portion 48.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A fine bubble generating nozzle comprising:
a nozzle unit; and
a baffle,
wherein the nozzle unit comprises:
an inlet into which a gas-dissolved pressurized water in which a gas is dissolved flows;
a pressure decreasing portion configured to decrease a pressure of the gas-dissolved pressurized water introduced from the inlet;
a first collision chamber disposed downstream of the pressure decreasing portion and including a first collision wall with which the gas-dissolved pressurized water introduced from the pressure decreasing portion collides so that a flow direction of the gas-dissolved pressurized water changes;
a second collision chamber disposed downstream of the first collision chamber and including a second collision wall with which the gas-dissolved pressurized water having flowed through the first collision chamber collides so that the flow direction of the gas-dissolved pressurized water changes; and
an outlet from which the gas-dissolved pressurized water having flowed through the second collision chamber flows out,
wherein the baffle is disposed outside of the nozzle unit and is disposed at a position facing the outlet in a direction extending parallel to a central axis of the nozzle unit,
wherein the gas-dissolved pressurized water flowing in the pressure decreasing portion flows in a first flow direction, the first flow direction being a direction from a first side toward a second side of a direction extending along the central axis of the nozzle unit,
the first collision wall is planer-shaped, wherein the flow direction of the gas-dissolved pressurized water is configured to change from the first flow direction to a second flow direction by the gas-dissolved pressurized water colliding with the first collision wall, the second flow direction being a direction from the second side toward the first side of the direction extending along the central axis of the nozzle unit, and
the flow direction of the gas-dissolved pressurized water is configured to change from the second flow direction to the first flow direction by the gas-dissolved pressurized water colliding with the second collision wall.

2. The fine bubble generating nozzle according to claim 1, wherein
the baffle entirely covers the outlet when the fine bubble generating nozzle is seen from the baffle along a first direction extending along a flow path axis, the flow path axis being an axis of a flow path connecting the second collision wall and the outlet.

3. The fine bubble generating nozzle according to claim 1, wherein
in a second direction extending along the central axis of the nozzle unit,
the first collision wall is disposed on a first side than the pressure decreasing portion,
the second collision wall is disposed on a second side opposite the first side than the first collision wall,
the outlet is disposed between the first collision wall and the second collision wall, and
the baffle is disposed between the first collision wall and the outlet.

4. The fine bubble generating nozzle according to claim 1, wherein the flow direction of the gas-dissolved pressurized water is configured to change to a specific direction by the gas-dissolved pressurized water colliding with the baffle, the specific direction being orthogonal to the direction extending along the central axis of the nozzle unit.

5. A fine bubble generating nozzle comprising:
a nozzle unit; and
a baffle,
wherein the nozzle unit comprises:
an inlet into which a gas-dissolved pressurized water in which a gas is dissolved flows;
a pressure decreasing portion configured to decrease a pressure of the gas-dissolved pressurized water introduced from the inlet;
a first collision chamber disposed downstream of the pressure decreasing portion and including a first collision wall with which the gas-dissolved pressurized water introduced from the pressure decreasing portion collides so that a flow direction of the gas-dissolved pressurized water changes;
a second collision chamber disposed downstream of the first collision chamber and including a second collision wall with which the gas-dissolved pressurized water having flowed through the first collision chamber collides so that the flow direction of the gas-dissolved pressurized water changes; and
an outlet from which the gas-dissolved pressurized water having flowed through the second collision chamber flows out,
wherein the baffle is disposed outside of the nozzle unit and is disposed at a position facing the outlet
wherein the baffle is constituted of an elastic material,
wherein the nozzle unit comprises an attaching portion to which the baffle is attached, and
when the baffle is attached to the attaching portion, there is a space between the attaching portion and the baffle,
in a second direction extending along a central axis of the nozzle unit,
the first collision wall is disposed on a first side than the pressure decreasing portion,
the outlet is disposed between the first collision wall and the second collision wall, and
the second collision wall is disposed on a second side opposite the first side than the first collision wall,
wherein the nozzle unit further comprises a peripheral wall extending from an outer end of the first collision wall toward the second side of the second direction and defining a flow path between the first collision chamber and the second collision chamber,
wherein the attaching portion protrudes outward from the peripheral wall, and
when the baffle is attached to the attaching portion, a first side end of the baffle is disposed on the second side than the first collision wall.

6. A fine bubble generating nozzle comprising:
a nozzle unit; and
a baffle, wherein the nozzle unit comprises:
an inlet into which a gas-dissolved pressurized water in which a gas is dissolved flows;
a pressure decreasing portion configured to decrease a pressure of the gas-dissolved pressurized water introduced from the inlet;
a first collision chamber disposed downstream of the pressure decreasing portion and including a first collision wall with which the gas-dissolved pressurized water introduced from the pressure decreasing portion collides so that a flow direction of the gas-dissolved pressurized water changes;
a second collision chamber disposed downstream of the first collision chamber and including a second collision wall with which the gas-dissolved pressurized water having flowed through the first collision chamber collides so that the flow direction of the gas-dissolved pressurized water changes; and
an outlet from which the gas-dissolved pressurized water having flowed through the second collision chamber flows out,
wherein the baffle is disposed outside of the nozzle unit and is disposed at a position facing the outlet,
wherein the baffle entirely covers the outlet when the fine bubble generating nozzle is seen from the baffle along a first direction extending along a flow path axis, the flow path axis being an axis of a flow path connecting the second collision wall and the outlet,
wherein in a second direction extending along a central axis of the nozzle unit,
the first collision wall is disposed on a first side than the pressure decreasing portion,
the second collision wall is disposed on a second side opposite the first side than the first collision wall,
the outlet is disposed between the first collision wall and the second collision wall, and
the baffle is disposed between the first collision wall and the outlet,
wherein the baffle is constituted of an elastic material,
wherein the nozzle unit comprises an attaching portion to which the baffle is attached, and
when the baffle is attached to the attaching portion, there is a space between the attaching portion and the baffle,
wherein the nozzle unit further comprises a peripheral wall extending from an outer end of the first collision wall toward the second side of the second direction and defining a flow path between the first collision chamber and the second collision chamber,
wherein the attaching portion protrudes outward from the peripheral wall, and
when the baffle is attached to the attaching portion, a first side end of the baffle is disposed on the second side than the first collision wall.

* * * * *